Patented Oct. 30, 1923.

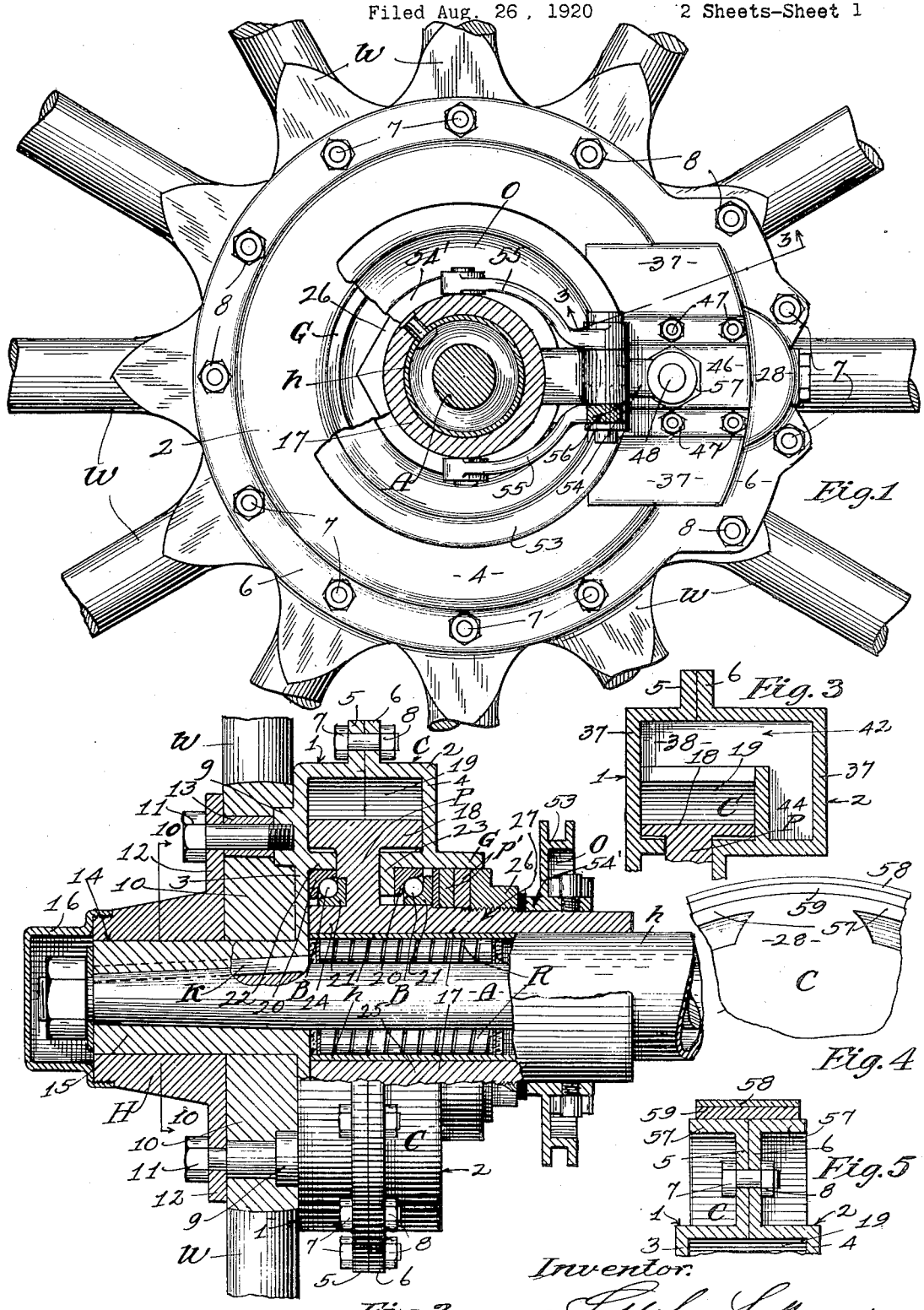

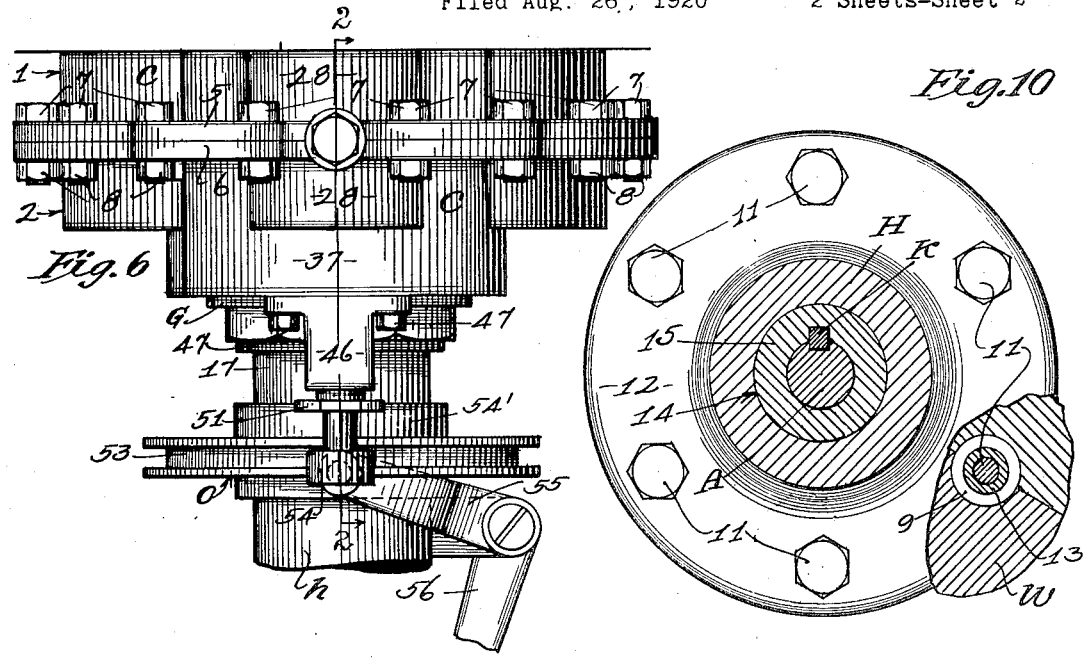
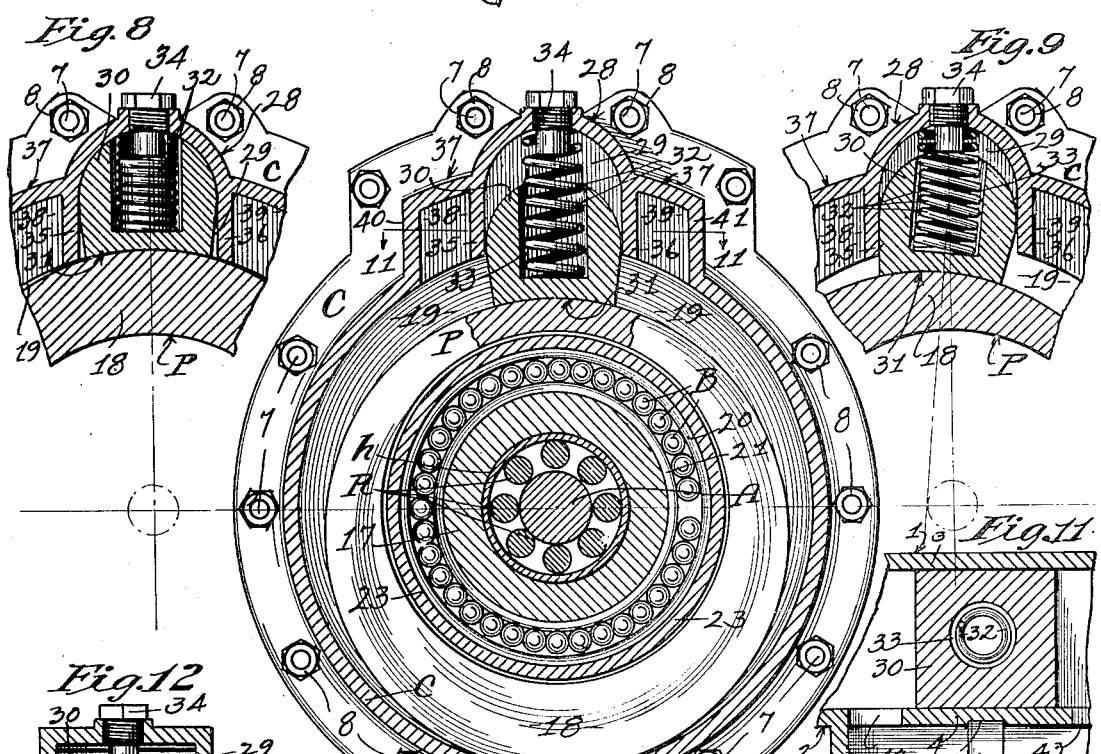
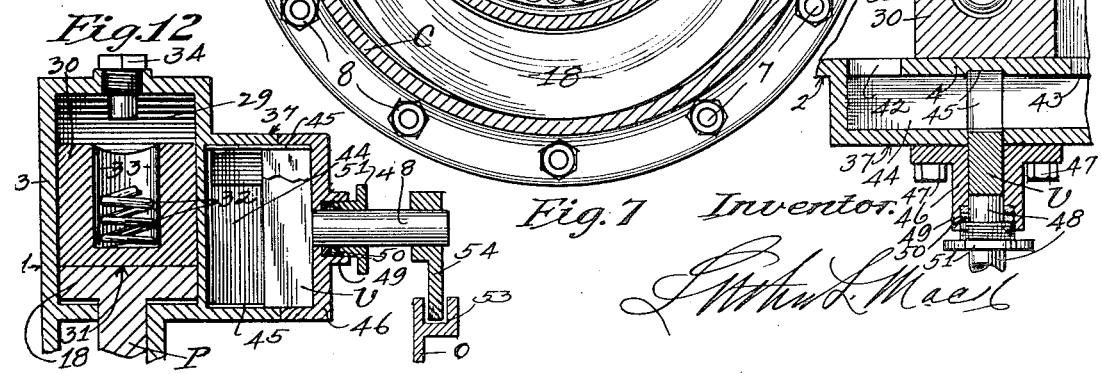

1,472,369

UNITED STATES PATENT OFFICE.

LUTHER L. MACK, OF SOUTH PASADENA, CALIFORNIA.

HYDRAULIC BRAKE MECHANISM.

Application filed August 26, 1920. Serial No. 406,280.

*To all whom it may concern:*

Be it known that I, LUTHER L. MACK, a citizen of the United States, and a resident of South Pasadena, in the county of Los Angeles, State of California, have invented new and useful Improvements in Hydraulic Brake Mechanisms, of which the following is a specification.

My invention relates generally to brake mechanisms and more particularly to a type of rotary fluid or oil brake capable of being applied effectively to motor vehicles, preferably at the wheels of such vehicles, and operable from the operator's seat in the vehicle for retarding or completely stopping the movement of the vehicle.

Motor vehicles, as well as other types of vehicles, such as trucks, horse drawn and motor driven, steam and electric cars have heretofore employed friction brakes for controlling their movement. In some cases, the brakes are attached to the wheels of the car or vehicle and in other cases to other driven elements, but in all cases friction between moving and stationary parts has been used to control the vehicle, with the result that a substantial wear and breakage of the parts ensues and replacements are frequently necessary.

It is, therefore, an object of my invention to provide an effective braking means for vehicles in which either fluid or air may be utilized as an element between the moving and stationary members of the brake, so that constant displacement of the said element may be effected during the uninterrupted operation of the vehicle and the displacement or movement of said element may be controlled for retarding the movement thereof.

Another object is the provision in a brake of the character stated of relatively stationary and movable and relatively concentric and eccentric brake members, attached, respectively, to a portion of the vehicle frame or axle housing and to the wheel or other driven element of the vehicle, whereby the control of the fluid or air held between said members may regulate the movement of the vehicle.

A further object is to provide in a brake of the character stated stator and rotor members relatively concentric and eccentric with the axis of a driven element of the vehicle, thus affording at all times a crescent shaped passage between said members in which a volume of oil or other fluid, or air or gas, may be held at all times during the operation of the vehicle, together with a movable abutment for closing and subdividing said passage into two substantially like portions, and a by-pass affording communication between opposite portions of said passage, around said abutment and having valve means therein for regulating the flow of the element. It will be quite obvious that in such case the speed of the driven element of the vehicle will be proportionate to the free or restricted flow of the element through said passage.

Another object is to provide a mechanism embodying a stator and a rotor, relatively concentric and eccentric, affording a passage for the reception of an element therebetween; a movable abutment disposed across said passage and having a face of arcuate character slidably engaging the face of attachment to the wheel and rear axle of said eccentric member.

A still further object of my invention is to provide a brake mechanism of the character hereinabove stated and adapted for a motor vehicle, without any substantial change being made in the vehicle to accommodate the brake mechanism, and capable of regulation by hand or foot effort upon the part of the driver of the vehicle.

Other objects will appear as the description progresses.

I have illustrated one practical embodiment of my invention, with modifications of some of the features, in the accompanying drawings, in which:

Fig. 1 is an elevation of one of my brake units applied to the inner side of an automobile wheel.

Fig. 2 is a sectional elevation of the same on a line cutting the axis of the vehicle rear axle.

Fig. 3 is a section on line 3—3 of Fig. 1.

Fig. 4 is a fragmentary side view of a unit arranged for supporting an emergency friction brake of usual character in connection with my service brake means.

Fig. 5 is a section of the same.

Fig. 6 is a plan view of the form of device shown in Figs. 1 and 2.

Fig. 7 is a sectional elevation of the same on a plane at right angles to Fig. 2.

Fig. 8 is a fragmentary section showing an extreme position of the stator and abutment.

Fig. 9 is a similar section showing a central position of the stator and abutment.

Fig. 10 is a section of the wheel hub on line 10, 10 of Fig. 2 showing the manner of attachment of the brake unit thereto.

Fig. 11 is a section on line 11—11 of Fig. 7.

Fig. 12 is a section on line 2—2 of Fig. 6.

While the drawings show the stator of my brake units attached to the rear axle housing of the vehicle and the rotor attached to the wheel thereof, said members being respectively, stationary and rotatable, it will be understood that this condition may be reversed with equally good results in many cases, and other changes may be made in the application of the mechanism for use, without departing from the spirit of my invention or enlarging the scope beyond that of the appended claims.

Referring now particularly to Figs. 1, 2, 6 and 7, it will be observed that each unit of my brake system includes as primary elements a rotor, or cylinder C, and a stator, or piston P. The cylinder comprises separable members 1 and 2 having side walls 3 and 4, respectively, and annular flanges 5 and 6, said flanges being held together for use by means of a plurality of bolts 7, 7, etc., having nuts 8, 8, thereon.

Wall 1 of cylinder C has a plurality of bosses 9, 9, etc., formed thereon which are adapted to seat in corresponding counterbores in the hub portion 10 of the wheel W and are threaded to receive the ends of cap screws 11, 11, etc., which extend through the flange 12 of the wheel hub H and portion 10 of said wheel and carry sleeves 13 thereon, as shown in Fig 2.

Hub H is bored at 14 to receive a hub 15 integrally and concentrically formed on the cylinder member 1 and the usual hub cap 16 may be attached to the end of the hub H in the usual manner. The stator, or piston P has a hub 17 which may be held in a suitable manner on the outer portion of the rear axle housing $h$ of the vehicle, and an eccentric rim 18 which provides a crescent shaped space 19 internally of the cylinder C at all times.

The inner surfaces of the cylinder C are turned or ground to a perfect fit with the edges and face of the stator P so that very little if any leakage will occur between said members when the brake is in operation.

The cylinder is rotatably mounted on the stator by means of a pair of ball bearing units B, B, the balls of which are held in annular cones 20 and 21 in each case. Cones 20 are held in annular extensions 22 and 23 of the cylinder and cones 21 are held on the portions 24 and 25 of the stator hub 17, as shown in Fig. 2.

The usual roller bearings R, are provided within the axle housing $h$ in the usual position and manner, and the axle A extends through the housing $h$ and has its tapered outer end keyed to the hub 15 of the cylinder member 1 by means of an elongated key K. Thus, the cylinder is rigidly attached to and rotates with the wheel W and the stator is mounted rigidly and is held stationary on the rear axle housing $h$.

Cylinder member 2 has an annular packing gland G on its inner side, around the hub 17 of the stator P, in which packing rings P', P', may be held by means of a member 26 threaded on the portion 27 of the stator hub and adapted to be adjusted in its position in the usual manner for tightening the packing rings in the gland, so as to prevent the leakage of the brake element from the interior of the cylinder.

At a convenient point on the periphery of the cylinder C, I provide a radially formed enlargement 28 having a chamber, or space 29 therein. An abutment, or closure 30 is movably held in the space 29 and has a curved outer end fitting the curvature of the space 29 and a curved inner face 31 fitting the periphery of the eccentric rim of the stator. This abutment is of subtantial width and length so as to afford ample contact with the face of the stator, and a spring 32 is held in recess 33 in a said abutment and is adapted to compress against the outer wall of the space 29 for holding said abutment in firm but resilient engagement with the stator at all times during the operation of the vehicle. A screw 34 may be provided on the outer side of the enlargement 28 for extension substantially into the coil of the spring 32 so as to hold the upper end of the said spring in position during the movement of the abutment.

The inner face of the abutment 30 is slightly narrower than the outer portion so that as the center of the stator face is moved about the axis of the axle A the abutment may oscillate sufficiently to clear the walls 35 and 36 at the sides of space 29. Obviously, in addition to its oscillating movement the abutment 30 also reciprocates in the space 29, as indicated in the three positions shown in Figs. 7, 8 and 9, and all of its movement is against the tension of the spring 32.

An elongated enlargement 37 is provided on the periphery and inner side of the cylinder C, providing transverse passages 38, and 39 between the walls 35 and 36 of the space 29 and the walls 40 and 41 of the said enlargement, and said passages 38 and 39 have ports 42 and 43, respectively, which afford communication with a by-pass chamber 44. Thus, the opposite and separate portions of the cylinder space, on each side of the abutment 30 are in communication by means of the passages 38 and 39, ports 42 and 43 and by-pass 44, and as long as the full area of the by-pass 44 is open the movement of the brake element employed in the cylinder space will be free and uninterrupted. It will be apparent also that the regulation of the movement of the element through the by-pass will effect a corresponding retardation or stoppage of the driven wheel W, by means of the connections described.

In order to provide for such regulation of the flow of the brake element I have shown a suitable means which may be modified in structure and operation to suit varying requirements but will suffice to illustrate the practicability of my mechanism. This regulating device is shown in Figs. 2, 6, 11 and 12, particularly and includes a sliding gate valve V disposed transversely across the by-pass 44 in grooves 45, 45 formed in the walls of the by-pass, as shown in Fig. 11. The valve is carried in a housing 46 attached to the portion 37 by means of screws 47, 47, etc., and has a stem 48 held in a stuffing box 49, the packing rings 50 of which are adjustable by means of a threaded member 51.

The hub portion 17 of the stator slidably carries a valve operating member O which has an annularly grooved outer portion 53 adapted to be constantly engaged by an arm 54 held on the outer end of valve stem 48 which revolves with the cylinder C, (see Fig. 12), and a hub portion 54' which connects with a yoke 55 supported on a suitable portion of the axle housing or a bracket attached thereto, as shown in Fig. 1. This yoke may have a bell crank arm 56 for connection with the usual brake rods and pedal of motor vehicles, and it will be obvious that the movement of the yoke by the usual means will effect a corresponding movement of the valve V, and thus regulate the area of passage 44, regardless of the position of arm 54 relative to member O.

It will be understood that my brake units just described are particularly adaptable to the replacement of the usual and well known external "service" brakes of motor vehicles, where effective braking means must be provided in order to safeguard the operation of the car and the lives of its occupants. When necessary the cylinder C may be provided with an annular outer member 57, as shown in Figs. 4 and 5, on which may be mounted an external brake band 58 having a friction non-burning band 59 of usual character thereon for use in emergency or when required for holding the vehicle for long periods of time when leakage might occur in the hydraulic brake units sufficient to cause a movement of the car. Bands 58 and 59 may be connected in the usual manner with the emergency brake lever of the vehicle.

It will be understood from the foregoing description of my improved mechanism that the braking effort exerted on the vehicle wheel, or upon the driven element, will be uniform in both directions, as the arrangement of the several parts, namely, the cylinder, stator and abutment is symmetrical.

It is obvious also that the elements of my mechanism may be applied with minor modifications to rotary pumps, engines and compressors with uniformly good results, and as a braking system the mechanism may be applied to the propeller shafts of automobiles or to other parts of the transmission in an effective manner. I do not, therefore, desire to limit myself to the particular application of my improvements to the uses stated and described, but desire it to be understood that the principles involved may be successfully employed in other forms of devices.

What I claim is:

1. A device of the character described including a driven shaft, a wheel fixed to the outer end of said shaft, a cylinder rotatable with said wheel, an eccentric stator mounted within said cylinder and having a hub portion extended therethrough, a space being formed between said cylinder and said stator, a yieldable abutment radially movable in said cylinder and having its inner face in permanent engagement with the periphery of said stator, a by-pass communicating with said cylinder space on opposite sides of said abutment, a valve in said by-pass and means for operating said valve for restricting the area of said by-pass during the rotation of said valve with said cylinder.

2. A device of the character described including a driven shaft, a stator eccentrically relative to said shaft, a cylinder enclosing said stator and concentrically mounted on and rotatable with said shaft, a by-pass communicating with said cylinder at spaced points and having a valve therein, an abutment slidably and oscillatably carried by said cylinder member between the openings of said by-pass, the inner face of said abutment being in permanent engagement with the periphery of said stator, and means for operating said valve for restricting the area of said by-pass during the rotation of said cylinder.

3. A device of the character described including a driven shaft, a stator eccentrically relative to said shaft, a cylinder enclosing said stator and concentrically mounted on and rotatable with said shaft, a by-pass communicating with said cylinder at spaced points and having a valve therein, an abutment slidably and oscillatably carried by said cylinder member between the openings of said by-pass, the inner face of said abutment being in permanent engagement with the periphery of said stator, and means for operating said valve for restricting the area of said by-pass during the rotation of said cylinder, said abutment being of integral form and being spring held for contact with said stator.

4. A device of the character described including a driven shaft, a stator eccentrically relative to said shaft, a cylinder enclosing said stator, and concentrically mounted on and rotatable with said shaft, a by-pass communicating with said cylinder at spaced points and having a valve therein, an abutment slidably and oscillatably carried by said cylinder member between the openings of said by-pass, the inner face of said abutment being in permanent engagement with the periphery of said stator, and means for operating said valve for restricting the area of said by-pass during the rotation of said cylinder, said abutment being of integral form and being spring held for contact with said stator, the inner face of said abutment being curved to conform to the periphery of said stator, and the outer portion thereof being concentrically formed relative to its axis for permittting the oscillation thereof.

5. A device of the character described embodying a driven shaft, a cylinder concentric with and rotatable with said shaft, a relatively eccentric stator enclosed by said cylinder providing a space in said cylinder therebetween, radially formed recesses in said cylinder communicating with said space and having its outer portion semi-circular and forming a bearing surface, an abutment mounted at said recess and having its outer surface curved to conform to the outer portion of said recess, the opposite sides of said abutment being tapered inwardly for permitting the radial and oscillatable movement of said abutment, for the purpose described.

6. A device of the character described embodying a driven shaft, a cylinder concentric with and rotatable with said shaft, a relatively eccentric stator enclosed by said cylinder providing a space in said cylinder therebetween, radially formed recess in said cylinder communicating with said space and having its outer portion semi-circular and forming a bearing surface, an abutment mounted at said recess and having its outer surface curved to conform to the outer portion of said recess, the opposite sides of said abutment being tapered inwardly for permitting the radial and oscillatable movement of said abutment, and spring means mounted in said recess for holding said abutment in permanent engagement with said stator.

7. A device of the character described embodying a driven shaft, a cylinder concentric with and rotatable with said shaft, a relatively eccentric stator enclosed by said cylinder providing a space in said cylinder therebetween, radially formed recess in said cylinder communicating with said space and having its outer portion semi-circular and forming a bearing surface, an abutment mounted in said recess and having its outer surface curved to conform to the outer portion of said recess, the opposite sides of said abutment being tapered inwardly for permitting the radial and oscillatable movement of said abutment, and spring means mounted in said recess for holding said abutment in permanent engagement with said stator, a pair of spaced transverse passages being formed in said cylinder in communication with the space therein, and communicating at their outer extremities with a longitudinal passage forming a by-pass around said abutment, for the purpose described.

8. A device of the character described embodying a driven shaft, a cylinder concentric with and rotatable with said shaft, a relatively eccentric stator enclosed by said cylinder providing a space in said cylinder therebetween, radially formed recess in said cylinder communicating with said space and having its outer portion semi-circular and forming a bearing surface, an abutment mounted in said recess and having its outer surface curved to conform to the outer portion of said recess, the opposite sides of said abutment being tapered inwardly for permitting the radial and oscillatable movement of said abutment, and spring means mounted in said recess for holding said abutment in permanent engagement with said stator, a pair of spaced transverse passages being formed in said cylinder in communication with the space therein, and communicating at their outer extremities with a longitudinal passage forming a by-pass around said abutment, and a valve operably mounted in and for restricting the area of said by-pass, for the purpose described.

9. A device of the character described embodying a driven shaft, a cylinder concentric with and rotatable with said shaft, a relatively eccentric stator enclosed by said cylinder providing a space in said cylinder therebetween, radially formed recess in said cylinder communicating with said space and having its outer portion semi-circular and forming a bearing surface, an abutment mounted in said recess and having its outer surface curved to conform to the outer portion of said recess, the opposite sides of said abutment being tapered inwardly for permitting the radial and oscillatable movement of said abutment, spring means mounted in said recess for holding said abutment in permanent engagement with said stator, a pair of spaced transverse passages being formed in said cylinder in communication with the space therein, and communicating at their outer extremities with a longitudinal passage forming a by-pass around said abutment, and a valve operably mounted in and for restricting the area of said by-pass, said valve being rotatable with said cylinder, and means for operating said valve during the rotation thereof.

10. A device of the character described embodying a driven shaft, a cylinder concentric with and rotatable with said shaft, a relatively eccentric stator enclosed by said cylinder providing a space in said cylinder therebetween, radially formed recess in said cylinder communicating with said space and having its outer portion semi-circular and forming a bearing surface, an abutment mounted in said recess and having its outer surface curved to conform to the outer portion of said recess, the opposite sides of said abutment being tapered inwardly for permitting the radial and oscillatable movement of said abutment, spring means mounted in said recess for holding said abutment in permanent engagement with said stator, a pair of spaced transverse passages being formed in said cylinder in communication with the space therein, and communicating at their outer extremities with a longitudinal passage forming a by-pass around said abutment, a valve operably mounted in and for restricting the area of said by-pass, said valve having an operating arm extended in the direction of the axis of said cylinder, and means engaging said arm for operating said valve during the rotation of said cylinder.

11. A device of the character described embodying a driven shaft, a cylinder concentric with and rotatable with said shaft, a relatively eccentric stator enclosed by said cylinder providing a space in said cylinder therebetween, radially formed recess in said cylinder communicating with said space and having its outer portion semi-circular and forming a bearing surface, an abutment mounted in said recess and having its outer surface curved to conform to the outer portion of said recess, the opposite sides of said abutment being tapered inwardly for permitting the radial and oscillatable movement of said abutment, spring means mounted in said recess for holding said abutment in permanent engagement with said stator, a pair of spaced transverse passages being formed in said cylinder in communication with the space therein, and communicating at their outer extremities with a longitudinal passage forming a by-pass around said abutment, a valve operably mounted in and for restricting the area of said by-pass, and a longitudinally slidable member axially alined with said driven shaft and having an annular groove therein for receiving the end of said arm, whereby said valve may be operated during the rotation of said cylinder.

12. A device of the character described embodying a driven shaft, a cylinder concentric with and rotatable with said shaft, a relatively eccentric stator enclosed by said cylinder providing a space in said cylinder therebetween, a radially formed recess in said cylinder communicating with said space and having its outer portion semi-circular and forming a bearing surface, an abutment mounted in said recess and having its outer surface curved to conform to the outer portion of said recess, the opposite sides of said abutment being tapered inwardly for permitting the radial and oscillatable movement of said abutment, spring means mounted in said recess for holding said abutment in permanent engagement with said stator, a pair of spaced transverse passages being formed in said cylinder in communication with the space therein, and communicating at their outer extremities with a longitudinal passage forming a by-pass around said abutment, a valve operably mounted in and for restricting the area of said by-pass, a longitudinally slidable member axially alined with said driven shaft and having an annular groove therein for receiving the end of said arm, whereby said valve may be operated during the rotation of said cylinder, and means for slidably moving said operating member.

13. A device of the character described embodying a driven shaft, a cylinder having a hub at one side keyed to the extended end of said shaft, a wheel mounted on said hub, a hub attached to said wheel and to said cylinder, a housing around said shaft, a roller bearing around said shaft on the interior of said housing, and a stator fixed to said housing and enclosed by said cylinder, for the purpose described.

14. A device of the character described embodying a driven shaft, a cylinder having a hub at one side keyed to the extended end of said shaft, a wheel mounted on said hub, a hub attached to said wheel and to said cylinder, a housing around said shaft, a roller bearing around said shaft on the interior of said housing, a stator fixed to said housing and enclosed by said cylinder, said stator having a hub on each side thereof, and said cylinder having internal extensions spaced from said stator hub, and a pair of spaced ball-bearings held between said stator hub and said cylinder extensions, for the purpose described.

15. A device of the character described embodying a driven shaft, a cylinder having a hub at one side keyed to the extended end of said shaft, a wheel mounted on said hub, a hub attached to said wheel and to said cylinder, a housing around said shaft, a roller bearing around said shaft on the interior of said housing, a stator fixed to said housing and enclosed by said cylinder, said stator having a hub on each side thereof, said cylinder having internal extensions spaced from said stator hub, a pair of spaced ball-bearings held between said stator hub and said cylinder extensions, said cylinder having an external annular extension, and a packing gland adjustably held between said external extensions and said stator hub for packing said cylinder against leakage.

16. A device of the character described embodying a driven shaft, a cylinder having a hub at one side keyed to the extended end of said shaft, a wheel mounted on said hub, a hub attached to said wheel and to said cylinder, a housing around said shaft, a roller bearing around said shaft on the interior of said housing, a stator fixed to said housing and enclosed by said cylinder, said stator having a hub on each side thereof, said cylinder having internal extensions spaced from said stator hub, a pair of spaced ball-bearings held between said stator hub and said cylinder extensions, said cylinder having an external annular extension and a packing gland adjustably held between said external extension and said stator hub for packing said cylinder against leakage, and an abutment mounted in said cylinder for subdividing the space between said cylinder and said stator, for the purpose described.

17. A device of the character described embodying a driven shaft, a cylinder having a hub at one side keyed to the extended end of said shaft, a wheel mounted on said hub, a hub attached to said wheel and to said cylinder, a housing around said wheel, a roller bearing around said shaft on the interior of said housing, a stator fixed to said housing and enclosed by said cylinder, said stator having a hub on each side thereof, said cylinder having internal extensions spaced from said stator hub, a pair of spaced ball-bearings held between said stator hub and said cylinder extensions, said cylinder having an external annular extension and a packing gland adjustably held between said external extension and said stator hub for packing said cylinder against leakage, an abutment mounted in said cylinder for subdividing the space between said cylinder and said stator, and a by-pass around said abutment having a valve therein adapted for operation during the rotation of said cylinder.

18. A device of the character described embodying a driven shaft, a cylinder having a hub at one side keyed to the extended end of said shaft, a wheel mounted on said hub, a hub attached to said wheel and to said cylinder, a housing around said wheel, a roller bearing around said shaft on the interior of said housing, a stator fixed to said housing and enclosed by said cylinder, said stator having a hub on each side thereof, said cylinder having internal extensions spaced from said stator hub, a pair of spaced ball-bearings held between said stator hub and said cylinder extensions, said cylinder having an external annular extension and a packing gland adjustably held between said external extension and said stator hub for packing said cylinder against leakage, an abutment mounted in said cylinder for subdividing the space between said cylinder and said stator, a by-pass around said abutment having a valve therein adapted for operation during the rotation of said cylinder, and an operating member slidable on the hub of said stator for actuating said valve.

LUTHER L. MACK.

Witnesses:
  IRENE BREEN,
  CHAS. BAGG.